United States Patent
Sears

[15] 3,652,312
[45] Mar. 28, 1972

[54] PHTHALIMIDE PLASTICIZER AND NON-PROTEINACEOUS RESIN MIX

[72] Inventor: James Kern Sears, St. Louis, Mo.
[73] Assignee: Monsanto Company, St. Louis, Mo.
[22] Filed: Jan. 18, 1971
[21] Appl. No.: 107,469

Related U.S. Application Data

[63] Continuation-in-part of Ser. No. 704,562, Feb. 12, 1968.

[52] U.S. Cl. ..........................................106/176
[51] Int. Cl. ....................................C08b 27/52
[58] Field of Search ...............................106/177; 260/326 R

[56] References Cited

UNITED STATES PATENTS 2,452,315   10/1948   Morgan..............................260/326 R Primary Examiner—Theodore Morris
Attorney—Neal E. Willis, J. E. Maurer and Robert E. Wexler

[57] ABSTRACT

This invention relates to the use of certain phthalimides as plasticizers for non-proteinaceous thermoplastic resins.

23 Claims, No Drawings

PHTHALIMIDE PLASTICIZER AND NON-PROTEINACEOUS RESIN MIX

This application is a continuation-in-part of application Ser. No. 704,562, filed Feb. 12, 1968.

This invention relates to new and useful thermoplastic resinous compositions. In particular, this invention relates to new and improved thermoplastic resinous compositions containing certain phthalimides which improve the physical properties of the starting resin.

Normally, vinyl halide polymers such as polyvinyl chloride and copolymers thereof, which are widely employed in the plastics industry, are quite hard and brittle in nature and require the addition of substantial proportions of a plasticizer to improve their workability. Since some of the plasticizer is ordinarily retained in the plastic product, it is desirable that it possess certain characteristics. Among these desirable characteristics is the ability of a plasticizer to impart low-temperature flexibility to the product. The plasticizer must also be of low volatility to prevent its loss by evaporation. Other desirable characteristics of a plasticizer include low water absorption and leaching. It is also desirable that the plasticizer be one which does not allow the finished product be become hard and brittle and thereby easily fractured.

It is accordingly an object of this invention to provide improved non-proteinaceous thermoplastic resinous compositions.

It is a further object of this invention to provide novel plastic compositions comprising thermoplastic resins and certain phthalimides.

A still further object is to provide new resinous compositions having desirable physical properties.

Other objects and advantages of the invention will be apparent to those skilled in the art from the following detailed description and claims.

In accordance with this invention, it has been found that the above and still further objects are achieved by incorporating a thermoplastic resin and certain phthalimides.

Generally speaking, about 5 to 200 parts by weight of plasticizer can be used for each 100 parts by weight of thermoplastic resin. However, it is preferred to use from about 20 to 100 parts by weight of plasticizer per 100 parts by weight of resin.

The phthalimides of this invention are effective as plasticizers for non-proteinaceous thermoplastic resins and rubberlike materials. Examples of non-proteinaceous materials suitable for use with this invention include vinyl chloride polymers or copolymers, polyvinyl acetate, lower alkyl cellulose ethers such as methyl cellulose, ethyl cellulose, butyl cellulose and aralkyl cellulose ethers such as benzyl cellulose, cellulose esters of organic acids having two to four carbon atoms such as cellulose acetate, cellulose propionate, cellulose butyrate, cellulose acetate-butyrate and cellulose acetate-propionate, vinyl aromatic resins such as polystyrene, rubbery polymers such as the copolymers of butadiene with styrene or acrylonitrile and the terpolymer of acrylonitrile, butadiene and styrene, and polymers of $\alpha$-monoolefins having two to 10 carbon atoms such as the polymers and copolymers of ethylene, propylene, butene-1 and the like. Polymers of methyl methacrylate suitable for use in the practice of this invention include homopolymers of methyl methacrylate or copolymers with minor amounts, for example, up to 25 percent by weight, of another ethylenically unsaturated monomer copolymerizable therewith, for example, acrylic acid, methacrylic acid, the one to four carbon alkyl (i.e., methyl to butyl) esters of acrylic acid, the two to four carbon alkyl (i.e., ethyl, propyl and butyl) esters of methacrylic acid, vinyl acetate, acrylonitrile, various amides and styrene.

This invention is particularly applicable to halogen-containing vinyl resins. Thus, there may be employed resins derived from such vinyl compounds as vinyl chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide, such as vinyl chloride, with other monomers such as vinylidene chloride; vinyl esters of carboxylic acids, e.g., vinyl acetate, vinyl propionate, vinyl butyrate, vinyl benzoate; esters of unsaturated acids, e.g., alkyl acrylates such as methyl acrylate, ethyl acrylate, propyl acrylate, butyl acrylate, allyl acrylate, and the corresponding esters of methacrylic acid; vinyl aromatic compounds, e.g., styrene ortho-chlorostyrene, para-chlorostyrene, 2,5-dichlorostyrene, 2,4-dichlorostyrene, para-ethyl styrene, vinyl naphthalene, $\alpha$-methyl styrene, dienes such as butadiene and chlorobutadiene; unsaturated amides such as acrylic acid amide and acrylic acid anilide; unsaturated nitriles such as acrylic acid nitrile; esters of $\alpha,\beta$-unsaturated carboxylic acids, e.g., the methyl, ethyl, propyl, butyl, amyl, hexyl, heptyl, octyl, allyl, metallyl and phenyl esters of maleic, crotonic, itaconic and fumaric acids and the like. It should be recognized that the halogenated resins containing halogens other than chlorine, e.g., bromine, fluorine and iodine, are also operable in this invention. The halogenated resins may contain a varying proportion of halogen, depending upon the nature of the resin and its contemplated use. Those copolymers in which a predominant portion, i.e., more than 50 percent by weight of the copolymer, is made from a halogen-containing vinylidene monomer such as vinyl chloride represent a preferred class of polymers to be treated according to this invention.

The phthalimides useful as plasticizers with this invention have the general formula

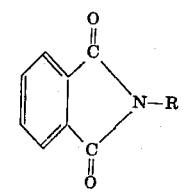

wherein R is selected from the group consisting of alkyl having seven to 20 carbon atoms, mixed alkyl having seven to 18 carbon atoms, cycloalkyl having seven to 18 carbon atoms, aryl having seven to 10 carbon atoms, aralkyl having seven to nine carbon atoms, alkaryl having seven to 18 carbon atoms and alkoxyalkyl having seven to 8 carbon atoms.

The alkyl and cycloalkyl radicals can be derived from many sources. For example, the alkyl radicals can be straight or branched chain radicals having up to 20 carbon atoms derived from various sources such as alcohols, including alcohols produced by the oxo synthesis or alcohols obtained by catalytic hydrogenation of coconut oil, from oxidized waxes or from esterification of a carbonyl group by reaction with an olefin. Illustrative examples of alkyl radicals are heptyl, 2-ethylheptyl, 2-ethylhexyl, octyl, isooctyl, 2-octyl, isononyl, dycyl, lauryl, tridecyl, tetradecyl, pentadecyl, octadecyl, crotyl, oleyl, alkyl radicals derived from $C_3$ to $C_{20}$ oxo alcohols, etc. Illustrative examples of cycloalkyl radicals are 2,4-dimethylcyclopentyl, 3,5-dimethylcyclohexyl, gem.-dimethylcyclohexyl, cyclohexylmethyl, cyclohexylpropyl, methylcyclohexylethyl, 2propylcyclohexyl, 3-dodecylcyclohexyl, cycloheptyl, 2,4-dimethylcycloheptyl, 2,3,5-trimethylcycloheptyl, etc.

Illustrative examples of aryl radicals are biphenyl, napthyl, etc. Illustrative examples of aralkyl radicals are benzyl, 4-methylbenzyl, 3-phenylpropyl, phenethyl, etc. Examples of alkaryl radicals useful with the invention include methylphenyl, butylphenyl, hexylphenyl, octylphenyl, nonylphenyl, dodecylphenyl, 1-methylnaphthyl, 2-methylnaphthyl, etc. Illustrative examples of alkoxyalkyl radicals are ethoxyamyl, methoxyhexyl, propoxybutyl, butoxybutyl and the like.

The mixed alkyl radicals can be derived from mixtures of straight chain aliphatic alcohols having between seven and about 18 carbon atoms. These are represented by the alcohols marketed by Continental Oil Company under the trade name Alfol 810, Alfol 1214, Alfol 1216 and Alfol 1618 and alcohols marketed by Archer Daniels Midland Company under the trade name Adol 9, Adol 12, Adol 52 and Adol 63. Alfol 810 consists primarily of 43% $C_8$ alcohols and 55% $C_{10}$ alcohols. Alfol 1214 comprises approximately 55% $C_{12}$ alcohols and 43% $C_{14}$ alcohols. Alfol 1216 has a composition approximating 63% $C_{12}$ alcohols, 24% $C_{14}$ alcohols, 10% $C_{16}$ alcohols and Alfol 1618 has 63% $C_{16}$ alcohols, 30% $C_{18}$ alcohols and 2% $C_{20}$ alcohols. Adol 9 is a mixture of straight chain fatty alcohols having the following composition: 55% $C_8$ alcohols, 35% $C_{10}$ alcohols and 10% $C_{12}$ alcohols. Adol 12 consists primarily of 2% $C_{10}$ alcohols, 90% $C_{12}$ alcohols and 8% $C_{14}$ alcohols. Adol 52 has an approximate composition of 4% $C_{14}$ alcohols, 90% $C_{16}$ alcohols and 6% $C_{18}$ alcohols. Adol 63 comprises 1% $C_{12}$ alcohols, 6% $C_{14}$ alcohols, 30% $C_{16}$ alcohols, 60% $C_{18}$ alcohols and 3% $C_{22}$ alcohols.

It is basic that blends of resins and plasticizers must be compatible to avoid obvious problems such as blooming, etc. Accordingly, the plasticizers utilized herein must be of a structure that hydrogen bonding does not take place between the plasticizer and the thermoplastic resin. Thus, the plasticizer must contain no active hydrogens and must be free of polarity-inducing groups, such as hydroxyl or amino groups, since such groups permit hydrogen bonding and the plasticizer would therefore be unsuitable for use in thermoplastic resins such as polyvinyl chloride. Conversely, compatibilizing groups, such as ester, ketone and halogen groups are desirable in the structure of the plasticizers disclosed herein.

The plasticizers of the present invention are readily prepared by methods well known in the art. For example, the phthalimides may be prepared by reacting phthalic acid or phthalic anhydride with an appropriate primary amine or by reacting potassium phthalimide with an alkyl halide. Each of these methods of preparing the phthalimides is fully shown and described in Beilstein, Organische Chemie 21, 461–469.

The invention will be more readily understood by reference to the following examples which describe the advantageous and unexpected results achieved by the use of the plasticizers of the present invention in thermoplastic resins. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

The following testing procedures are used in evaluating the physical properties and efficiency of plasticizers.

Compatibility - Visual inspection of the plasticized composition is employed, incompatibility of the plasticizer with the polymer being demonstrated by cloudiness and exudation of the plasticizer.

Low-temperature Flexibility - Low-temperature flexibility is one of the most important properties of elastomeric vinyl compositions. While many plasticizers will produce flexible compositions at room temperature, the flexibility of these compositions at low temperature may vary considerably, i.e., plasticized polyvinyl chloride compositions that are flexible at room temperature often become very brittle and useless at lower temperatures. Low-temperature flexibility tests herein employed are according to the Clash-Berg Method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized compositions usefulness as an elastomer.

Kerosene Extraction - Resistance to kerosene is measured as follows: A 2-inch diameter 40-mil disc is suspended in a 50° C. oven for a 3-hour conditioning period to eliminate water, then cooled and weighed. The conditioned sample is then immersed in 400 ml. of kerosene for a period of 24 hours at 23° C. The sample is then removed from kerosene, blotted dry and suspended in a force draft 80° C. oven for 4 hours. The sample is then cooled and weighed. The percent loss in weight is reported as the kerosene extraction value.

Water Resistance - The amount of water absorption and the amount of water leaching that take place when the plasticized composition is immersed in distilled water for 24 hours is determined.

Hardness - A standard instrument made by Shore Instrument Company is used for this determination and expresses the hardness in units from one to 100. The hardness of the composition is judged by its resistance to the penetration of a standard needle applied to the composition under a standard load for a standard length of time.

The following examples illustrate the advantageous and unexpected results which are achieved by the use of the plasticizers of the present invention in thermoplastic resinous compositions but it is not intended that this invention be limited by or to such examples.

EXAMPLE 1

One hundred parts by weight of polyvinyl chloride and 40 parts by weight of N-isooctyl phthalimide are mixed on a rolling mill to a homogeneous blend. During the milling, substantially no fuming or discoloration is observed. Testing of the molded sheet for low-temperature flexiblity, according to the procedure described above, gives a value of −20.9° C., which value denotes good low-temperature properties. Tests of the water resistance of the plasticized material show a loss of soluble matter of 0.30 percent and a water absorption value of 0.46 percent. A Shore hardness value of 71 is obtained on this composition. The plasticized material has a kerosene extraction value of 5.6 percent.

EXAMPLE 2

Following the procedure of Example 1, the N-isooctyl phthalimide plasticizer is replaced with 40 parts by weight of the following plasticizers:

| | |
|---|---|
| N-heptyl phthalimide | N-biphenyl phthalimide |
| N-octyl phthalimide | N-naphthyl phthalimide |
| N-nonyl phthalimide | N-benzyl phthalimide |
| N-decyl phthalimide | N-phenethyl phthalimide |
| N-dodecyl phthalimide | N-methylphenyl phthalimide |
| N-tridecyl phthalimide | N-nonylphenyl phthalimide |
| N-octadecyl phthalimide | N-2-methylnaphthyl phthalimide |
| N-($C_8$—$C_{10}$ alkyl) phthalimide | N-ethoxyamyl phthalimide |
| N-($C_{12}$—$C_{14}$ alkyl) phthalimide | N-methoxyhexyl phthalimide |
| N-dimethylcyclopentyl phthalimide | N-butoxypropyl phthalimide |
| N-trimethylcycloheptyl phthalimide | N-butoxybutyl phthalimide |
| N-tripropylcycloheptyl phthalimide | |

The plasticized resin compositions exhibit physical properties similar to those demonstrated in Example 1.

Similar results are obtained when the above phthalimides are compared at levels of 20, 30, 60, and 75 phr. (parts of plasticizer per hundred parts by weight of resin).

The substitution of other vinyl halide-containing resins for the polyvinyl chloride used in the examples, also results in effective plasticization. Similar improved compositions are obtained when the polyvinyl chloride is replaced by an equivalent amount of a copolymer of 95 parts of vinyl chloride and 5 parts of vinyl acetate, a copolymer of 90 parts of vinyl chloride and 10 parts of vinylidene chloride and a copolymer of 70 parts of vinyl chloride and 30 parts of diethylmaleate.

EXAMPLE 3

Individual plasticized compositions are prepared in accordance with the procedure of Example 1 wherein the polyvinyl chloride is replaced in each instance by 100 parts by weight of polymethyl acrylate, 100 parts of weight of polymethyl methacrylate, 100 parts by weight of a copolymer of 98 parts of methyl methacrylate and 2 parts of methacrylic acid, 100 parts by weight of a copolymer of 80 parts of methyl methacrylate and 20 parts of glycidyl methacrylate, and 100 parts by weight of a copolymer of 70 parts of methyl methacrylate and 30 parts of methyl acrylate. In each instance, the results parallel those obtained in the first example.

EXAMPLE 4

Samples of cellulose acetate, cellulose propionate, cellulose acetate butyrate, cellulose nitrate, methyl cellulose, ethyl cellulose, butyl cellulose and benzyl cellulose are mixed on a rolling mill to a homogeneous blend with 20 parts by weight of N-isooctyl phthalimide per 100 parts by weight of each thermoplastic resin. The resultant products are pressed into films and are found to be more flexible than films obtained from the thermoplastic resins in the absence of the plasticizer.

EXAMPLE 5

The procedure of Example 1 is repeated except that the polyvinyl chloride is replaced by 100 parts by weight of individual resins, namely, polyethylene, polypropylene, polyvinyl acetate, polystyrene, a copolymer of 40 parts of styrene and 60 parts of acrylonitrile and a copolymer of 70 parts of styrene and 30 parts of acrylonitrile. In each instance, the plasticized resin compositions exhibit physical properties comparable to those demonstrated in the previous examples.

The phthalimides of the present invention may be employed as the sole plasticizer in resin compositions or may be used in combination with other known conventional plasticizers or softening agents commonly employed with such resins. Illustrative of the latter plasticizers are diethyl phthalate, dibutylphthalate, di-2-ethylhexylphthalate, dibutyl sebacate, triethyl phosphate, trioctyl phosphate and methyl phthalyl ethylglycolate.

For many purposes, it may be desirable to blend other conventional additives with the plasticized thermoplastic resinous compositions of the present invention. Illustrative of such additives are fillers, dyes, pigments, heat and light stabilizers, lubricants and the like. It will be apparent that compositions containing such other additives are within the scope of this invention.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A non-proteinaceous composition of matter comprising a thermoplastic resin and a plasticizer therefor having the general formula

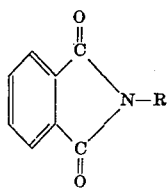

wherein R is selected from the group consisting of a hydrocarbon alkyl having seven to 20 carbon atoms, mixed alkyl having seven to 18 carbon atoms, cycloalkyl having seven to 18 carbons atoms, aryl having seven to 10 carbon atoms, aralkyl having seven to nine carbon atoms, alkaryl having seven to 18 carbon atoms and alkoxyalkyl having seven to 8 carbon atoms and alkoxyalkyl having seven to 8 carbon atoms, wherein said plasticizer is present in plasticizing amounts of from about five to about 200 parts by weight per 100 parts by weight of said resin.

2. A composition as defined in claim 1 wherein R is alkyl having seven to 12 carbon atoms.

3. A composition as defined in claim 1 wherein said compound is N-isooctyl phthalimide.

4. A composition as defined in claim 1 wherein said compound is present in amounts of from about 20 to about 100 parts by weight per 100 parts by weight of said thermoplastic resin.

5. A composition as defined in claim 1 wherein said thermoplastic resin is a vinyl halide polymer selected from the group consisting of polymerized vinyl halide monomers and copolymers of such monomers with an ethylenically unsaturated monomer, at least 50 percent of the monomer units of said copolymers being vinyl halide units.

6. A composition as defined in claim 1 wherein said thermoplastic resin is a vinyl halide polymer selected from the group consisting of polymerized vinyl halide monomers and copolymers of such monomers with an ethylenically unsaturated monomer, at least 50 percent of the monomer units of said copolymers being vinyl halide units and R is alkyl having four to 12 carbon atoms.

7. A composition as defined in claim 1 wherein said thermoplastic resin is a vinyl halide polymer selected from the group consisting of polymerized vinyl halide monomers and copolymers of such monomers with an ethylenically unsaturated monomer, at least 50 percent of the monomer units of said copolymers being vinyl halide units and said compound is N-isooctyl phthalimide.

8. A composition as defined in claim 1 wherein said thermoplastic resin is polyvinyl chloride and said compound is N-isooctyl phthalimide.

9. A composition as defined in claim 1 wherein said thermoplastic resin is a polymer of an $\alpha$-monoolefin having two to 10 carbon atoms.

10. A composition as defined in claim 1 wherein said thermoplastic resin is a polymer of an $\alpha$-monoolefin having two to 10 carbon atoms and R is alkyl having four to 12 carbon atoms.

11. A composition as defined in claim 1 wherein said thermoplastic resin is a cellulose ester of an organic acid having two to four carbon atoms.

12. A composition as defined in claim 1 wherein said thermoplastic resin is a cellulose ester of an organic acid having two to four carbon atoms and R is alkyl having seven to 12 carbon atoms.

13. A composition as defined in claim 1 wherein said thermoplastic resin is a cellulose ester of an organic acid having two to four carbon atoms and said compound is N-isooctyl phthalimide.

14. A composition as defined in claim 1 wherein said thermoplastic resin is a cellulose ether selected from the group consisting of lower alkyl cellulose ethers and aralkyl cellulose ethers.

15. A composition as defined in claim 14 wherein said cellulose ether is ethyl cellulose.

16. A composition as defined in claim 14 wherein said cellulose ether is butyl cellulose.

17. A composition as defined in claim 14 wherein said cellulose ether is benzyl cellulose.

18. A composition as defined in claim 1 wherein said thermoplastic resin is a cellulose ether selected from the group consisting of lower alkyl cellulose ethers and aralkyl cellulose ethers and R is alkyl having seven to 12 carbon atoms.

19. A composition as defined in claim 1 wherein said thermoplastic resin is a polymer of methyl methacrylate selected from the group consisting of homopolymers of methyl methacrylate and copolymers of methyl methacrylate containing at least 75 percent methyl methacrylate and up to 25 percent of an ethylenically unsaturated monomer copolymerizable therewith.

20. A composition as defined in claim 1 wherein said thermoplastic resin is a polymer of methyl methacrylate selected from the group consisting of homopolymers of methyl methacrylate and copolymers of methyl methacrylate containing at least 75 percent methyl methacrylate and up to 25 percent of an ethylenically unsaturated monomer copolymerizable therewith and R is alkyl having seven to 12 carbon atoms.

21. A composition as defined in claim 1 wherein said thermoplastic resin is a polymer of methyl methacrylate selected from the group consisting of homopolymers of methyl methacrylate and copolymers of methyl methacrylate containing at least 75 percent methyl methacrylate and up to 25 percent of an ethylenically unsaturated monomer copolymerizable therewith and said compound is N-isooctyl phthalimide.

22. A composition as defined in claim 1 wherein said thermoplastic resin is polymethyl methacrylate.

23. A composition as defined in claim 1 wherein said thermoplastic resin is a copolymer of from about 40 to about 70 parts of styrene and from about 30 to about 60 parts of acrylonitrile.

* * * * *